United States Patent
Smicklevich

(10) Patent No.: US 8,845,939 B1
(45) Date of Patent: Sep. 30, 2014

(54) FOAM PRODUCT WITH AN INSERT AND ITS METHOD OF MANUFACTURE

(75) Inventor: Mickey Smicklevich, Stow, OH (US)

(73) Assignee: Remington Products Company, Wadsworth, OH (US)

( * ) Notice: Subject to any disclaimer, the term of this patent is extended or adjusted under 35 U.S.C. 154(b) by 861 days.

(21) Appl. No.: 12/313,703

(22) Filed: Nov. 25, 2008

(51) Int. Cl.
    *B29C 44/06* (2006.01)

(52) U.S. Cl.
    USPC ........................................ 264/46.4

(58) Field of Classification Search
    CPC .... B29C 44/06; B29C 44/12; B29C 44/1204; B29C 44/1209; B29C 44/1214; B29C 44/1266; B29C 44/1276
    USPC .............................................. 264/46.4, 45.1
    See application file for complete search history.

(56) References Cited

U.S. PATENT DOCUMENTS

| | | | |
|---|---|---|---|
| 3,082,486 A * | 3/1963 | Khawam et al. | 264/46.4 |
| 4,130,614 A * | 12/1978 | Saidla | 264/46.4 |
| 4,176,476 A | 12/1979 | Hassell | 36/44 |
| 4,648,923 A | 3/1987 | Chapnick | 156/82 |
| 4,657,716 A | 4/1987 | Schmidt | 264/45.7 |
| 4,674,204 A | 6/1987 | Sullivan et al. | 36/44 |
| 4,823,483 A | 4/1989 | Chapnick | 36/43 |
| 5,203,793 A | 4/1993 | Lyden | 36/88 |
| 5,219,197 A * | 6/1993 | Rich et al. | 293/120 |
| 5,463,824 A | 11/1995 | Barna | 36/44 |
| 5,547,620 A | 8/1996 | Guiotto | 264/46.4 |
| 5,695,580 A | 12/1997 | Huarng | 36/44 |
| 5,799,658 A * | 9/1998 | Falco | 128/864 |
| 5,994,245 A | 11/1999 | Marier et al. | 442/373 |
| 6,045,733 A | 4/2000 | Chu et al. | 264/46.6 |
| 6,149,852 A | 11/2000 | Romanato et al. | 264/229 |
| 6,280,815 B1 | 8/2001 | Ersfeld et al. | 36/44 |
| 2001/0001687 A1* | 5/2001 | Pokorzynski et al. | 428/318.6 |
| 2008/0157417 A1* | 7/2008 | Kim | 264/46.5 |

* cited by examiner

*Primary Examiner* — Larry Thrower
*Assistant Examiner* — Xue Liu
(74) *Attorney, Agent, or Firm* — Renner, Kenner, Greive, Bobak, Taylor & Weber

(57) ABSTRACT

A product, such as an insole (21, 22) or the like, is formed in a mold (20) having mold cavities (26, 27) therein. A porous insert (33, 34) is placed in the cavities (26, 27) and a foamable material (35) is introduced into the cavities (26, 27). When the material (35) cures, it impregnates the inserts (33, 34) which makes them more rigid. The resulting insoles (21, 22) thereby have a portion made up entirely of foam (35) and a portion made up of the insert material (33, 34) rigidified by the foam (35).

9 Claims, 5 Drawing Sheets

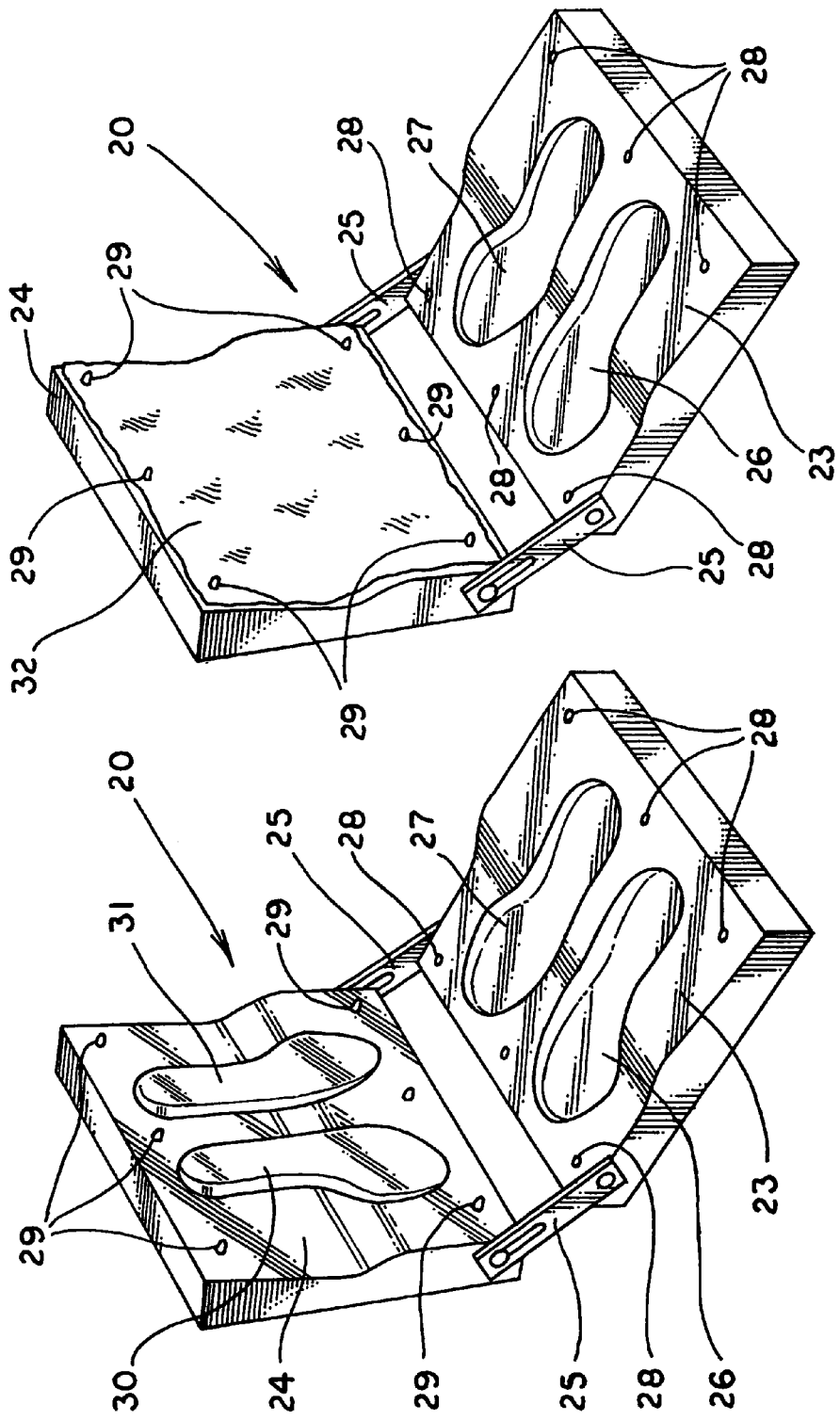

FOAM PRODUCT WITH AN INSERT AND ITS METHOD OF MANUFACTURE

TECHNICAL FIELD

This invention relates to a foam product and its method of manufacture. More particularly, this invention relates to a foam product which is formed with a semi-rigid material therein created when a pliant, fibrous material is impregnated with the foam during the molding process. Such a product can be formed as an insole, knee pad or the like.

BACKGROUND ART

There are many types of foam products to protect, or make more comfortable, areas of the body of a person. For example, a foam layer in a helmet protects one's head and a foam insole is used to provide comfort for the feet of the user. For some products, however, it is important and required that at least a portion of the insole be rigid, or at least semi-rigid, rather than the completely padded condition created by a product made entirely of foam. For example, a knee pad best protects the knee by having a rigid portion and yet should be rendered comfortable by having a foam portion positioned next to the knee of the user. Or the user of an insole may have feet which require that the arch or the heel be rigid with the rest of the insole being of the soft and pliant foam.

In the past, the formation of such a product required either insert molding the rigid item to the foam or the molding of two separate pieces which were then somehow, as by gluing, affixed to each other. That is, a rigid plastic material, for example, would be injection molded and then post applied to a molded foam article. However, not only does such a system require the molding of two separate parts, but also it requires the additional labor-intensive step of gluing and otherwise affixing the two components. Moreover, such glued components may well have a tendency to separate, dependent, for example, on the activity of the user. In addition, if it is desired to vary the thickness of the foam material or the thickness of the rigid material, multiple parts will have to be molded in multiple mold cavities.

Another tedious lamination process is shown in U.S. Pat. No. 5,994,225. There, an upper resilient foam layer and a lower mat are shaped for incorporation into footwear. The mat includes a stiff portion and a plurality of upper fibers which penetrate the foam material to attach the two layers. As with the other prior devices, such requires the separate formation of two pieces and the extra step of attaching the same, and, in addition, does not provide for partial or specially shaped stiffening of an otherwise resilient material.

The need exists, therefore, for a method of making a composite foam and rigid material product.

DISCLOSURE OF THE INVENTION

It is thus an object of one aspect of the present invention to provide a product and its method of manufacture which is of a foam material with preselected portions thereof being more rigid than the foam material.

It is an object of another aspect of the present invention to provide a product and method, as above, wherein the rigidity of the preselected portion can be controlled by selecting the thickness, density and/or rigidity of an insert placed in a mold when manufacturing the product.

It is an object of a further aspect of the present invention to provide a method and product, as above, which does not require the separate production of two materials for subsequent attachment.

It is an object of an additional aspect of the present invention to provide a method and product, as above, which does not require glue or other adhesives to form a product with two different stiffness factors.

These and other objects of the present invention, as well as the advantages thereof over existing prior art forms, which will become apparent from the description to follow, are accomplished by the improvements hereinafter described and claimed.

In general, a method of making a product in a mold includes the steps of inserting a porous material into the mold and inserting a foamable material into the mold. The foamable material is allowed to cure while at the same time impregnating the porous material so as to render the porous material more rigid.

An article made in accordance with the present invention includes a first portion formed of a foam material and a second portion of a predetermined size and configuration being formed of a material having a porosity which permits the second portion to be substantially impregnated with the foam material.

In accordance with another aspect of the invention, the article is made in a mold and includes a first portion formed of a material having a first rigidity and a second portion formed of a material originally having a second rigidity. The second portion is impregnated by the first portion during molding to form the product having the first portion of the first rigidity and the second portion of a third rigidity stiffer than the first and second rigidities.

A preferred exemplary article and its method of manufacture according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 1 is a somewhat schematic perspective view of a mold for making insoles which is one type of product which can be made in accordance with the present invention, the mold being shown in an open, empty condition.

FIG. 2 is a somewhat schematic perspective view of the mold of FIG. 1 showing a step in the manufacturing process following FIG. 1.

PREFERRED EMBODIMENT FOR CARRYING OUT THE INVENTION

Figure 9:
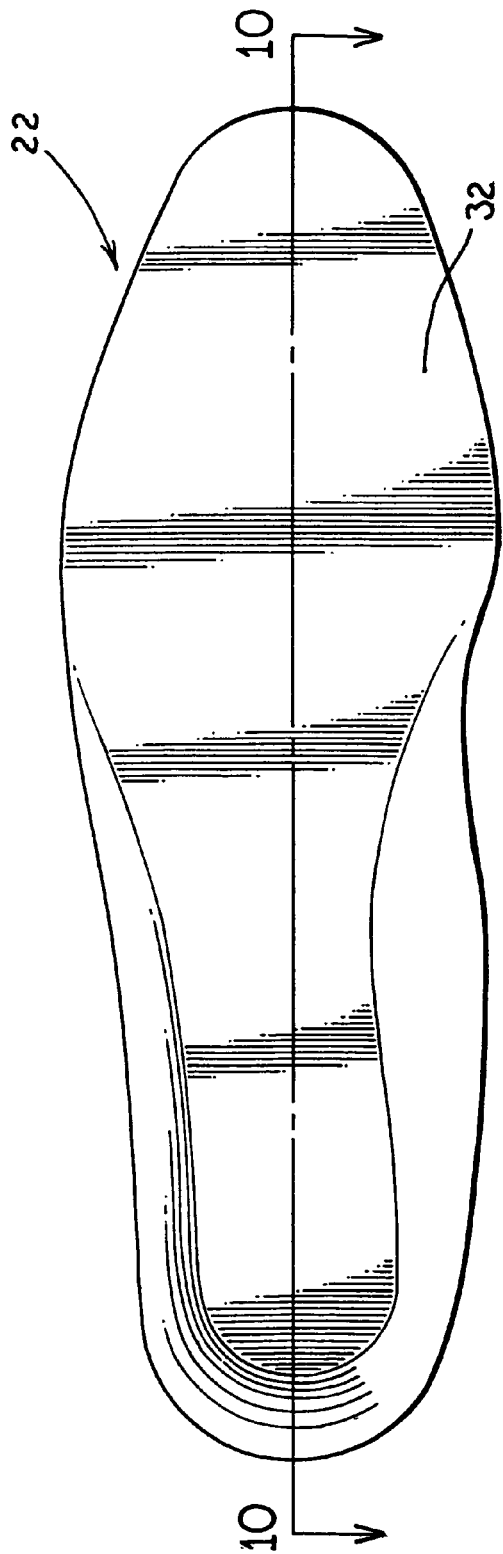
FIG. 9 is a bottom plan view of the other insole which was manufactured in accordance with the method shown in FIGS. 1-6.
Figure 10:
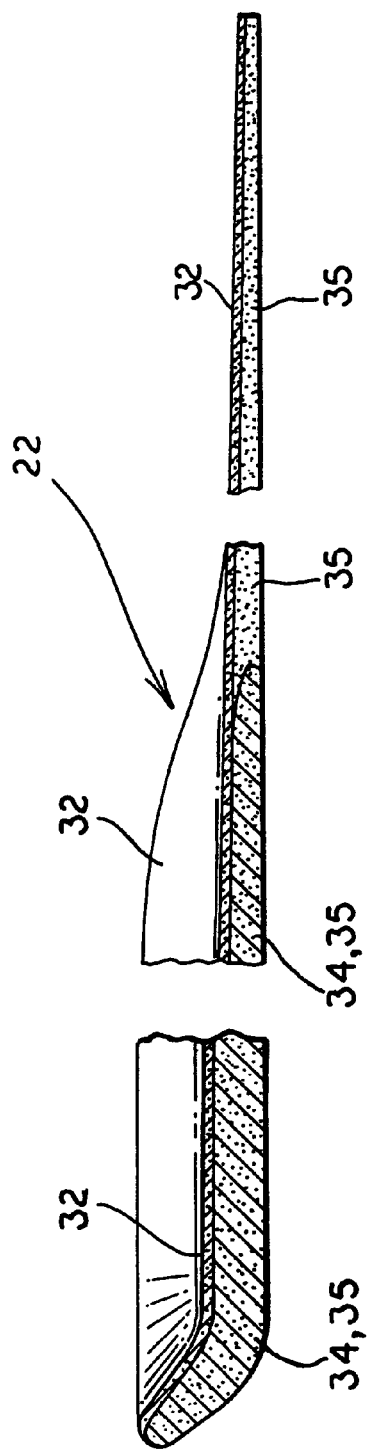
FIG. 10 is an enlarged, fragmentary sectional view taken substantially along line 10-10 of FIG. 9.

The present invention relates to the manufacture of articles in a mold which is generally indicated by the numeral 20 in FIGS. 1-6. The present invention also relates to the articles made in molds 20, and as will hereinafter become evident, while any article having the features hereinafter discussed could be made in accordance with the invention, insoles for footwear are one of the products which are ideally suited to be manufactured in accordance with the method of the present invention. Two such insoles are shown in FIGS. 7-10 and are indicated generally by the numerals 21 (FIGS. 7 and 8) and 22 (FIGS. 9 and 10).

Mold 20 is shown as having a lower section 23 and an upper section 24 which can be connected to lower section 23 in any conventional manner, such as by opposed hinge assemblies 25. As such, upper section 24 may articulate an hinge assemblies 25 from the open position shown in FIGS. 1-4 and 6, to the closed portion shown in FIG. 5. Alternatively, mold sections 23 and 24 could be mounted in a press which could open and close without the need for hinges.

Lower mold section 23 is shown as having two female cavities, 26 and 27, which are shaped, as desired, to form an article. Thus, in the instance described herein, cavities 26 and 27 are configured to form insoles 21 and 22. Specifically, cavities 26 and 27 dictate the plan configuration of the insoles, the shape of the bottom, and define the edges of the insoles. Lower mold section 23 is also shown as having a plurality of peripherally spaced apertures 28 which receive a like plurality of pins 29 extending from upper mold section 24 when mold 20 is closed. Upper mold section may also include male plug members 30 and 31 which are received in the tops of cavities 26 and 27, respectively, when mold 20 is closed to close cavities 26 and 27. Plug members 30 and 31 are thus of the same general plan configuration as cavities 26 and 27, respectively, and they dictate the contour of the top of the insoles 21 and 22.

It should be appreciated that the present invention is not limited to molds which ultimately produce two products. Rather, molds 20 could be of a size so as to produce at one time any number of articles, such as knee pads or the insoles shown, or, taken to the other extreme, the molds could be smaller and only produce one article. Thus, a mold 20 which produces two insoles, 21 and 22, at a time has been shown herein merely for illustration purposes.

The manner in which products such as insoles 21 and 22 are produced according to the method of the present invention is shown with reference to FIGS. 1-6. With mold 20 in the open and empty condition shown in FIG. 1, a sheet or film of material 32 may be attached to upper mold section 24 by piercing it with pins 29 to hold it against mold section 24 and over plug members 31 and 32 as shown in FIG. 2. Sheet 32 may be made of any suitable fabric, such as polyester, cambrell, or the like. As will hereinafter be evident, since sheet 32 will form the top of insoles 21 and 22, its primary quality will be to provide comfort to the user, since the user's feet will engage sheet material 32. However, some products will not need or will not use a fabric 32 layer at all. Moreover, when it is used, attaching it to pins 29 is only one way of applying it to the insoles. For example, instead of attaching it to pins 29, it could be manually inserted into the mold as will hereinafter become more evident.

In accordance with one aspect of the present invention, it is desired to make insoles or the like which have at least a portion thereof formed of a material which is at least more rigid than the conventional foam used to make such products. For example, it may be desired to provide rigid material at the arches of the insoles or the heels of the insoles. Or, it may be desired to provide the rigid material at the perimeter of the heels, with the center portion of the heels being made only of foam. In short, the rigid material may be localized in the insole or other product as desired.

Figure 3:
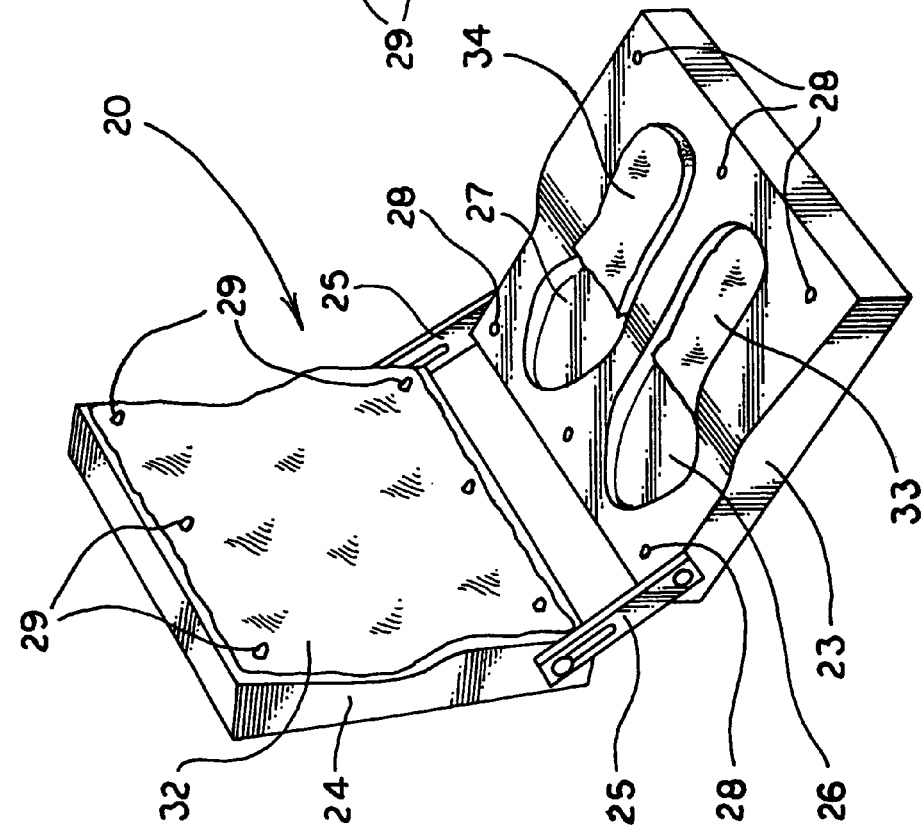
FIG. 3 is a somewhat schematic perspective view of the mold of FIG. 1 showing a step in the manufacturing process following FIG. 2.

To this end, an insert is positioned in the mold cavities. The shape of the insert is predetermined by the desires for the final product, as just discussed. In FIG. 3, it is shown that an insert 33 has been positioned in the heel portion of mold cavity 26 and an insert 34 has been positioned in the heel portion of mold cavity 27. As will hereafter be described, such results in insoles having more rigid areas at the heels than anywhere else and, if for example, it had been desired to provide a rigid heel perimeter, as discussed above, the central areas of inserts 33 and 34 would be cut out. In short, inserts 33 and 34 may be configured in plan to take on any designed shape in the final product.

The inserts may also vary in thickness. In fact, such is shown in the drawings as insert 34 is shown as being thicker than insert 33, even to the extent that it extends upwardly out of mold cavity 27. As will hereinafter become more evident, for the same material the thicker the insert, the more rigid it will be.

It is important that the inserts, such as inserts 33 and 34, be formed of a porous material. Any woven or non-woven porous or permeable fabric-like material such as polyester, felt, canvas, linen, foam or even a paper-like material will suffice as long as it is porous to the foam material. These materials are also pliant in nature, that is, they are not totally rigid. At the present time, a synthetic fabric, Style No. SCN01-024 made by Kern-Wove, Inc., of Charlotte, N.C., has been found to produce excellent results.

After inserts 33 and 34 have been placed in cavities 26 and 27, respectively, as shown in FIG. 3, a liquid foamable material 35 is introduced into the mold cavities. Material 35 may be of any suitable type of formable material, such as polyurethane, polyurethane foam, polyurethane elastomer or the like which is placed in mold 20 in a liquid form and which cures to a solid, but flexible, soft, sponge-like, form.

Figure 4:
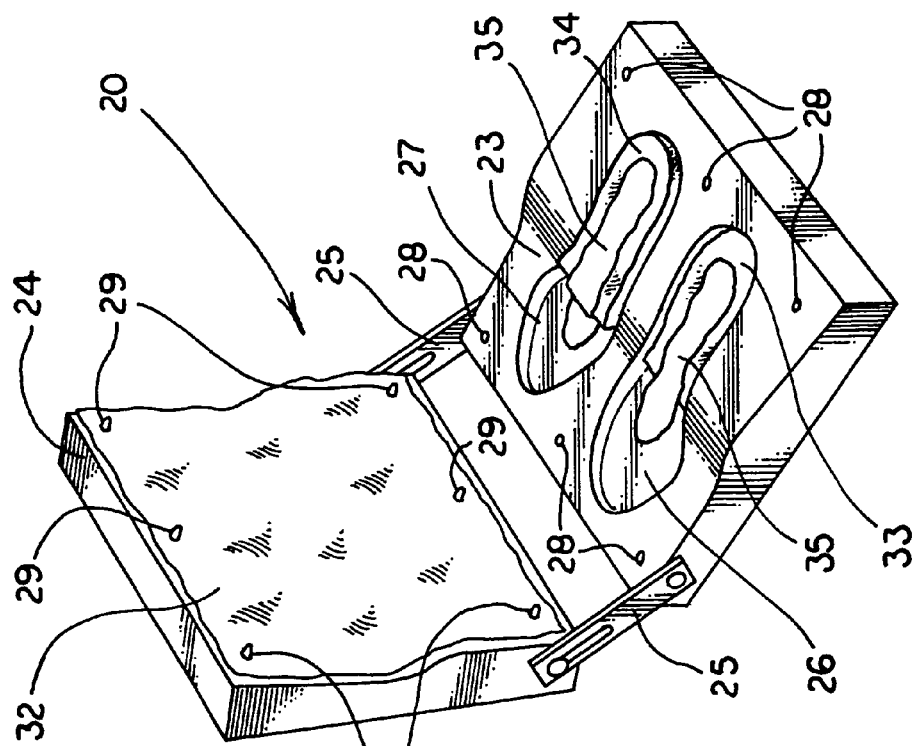
FIG. 4 is a somewhat schematic perspective view of the mold of FIG. 1 showing a step in the manufacturing process following FIG. 3.
Figure 5:
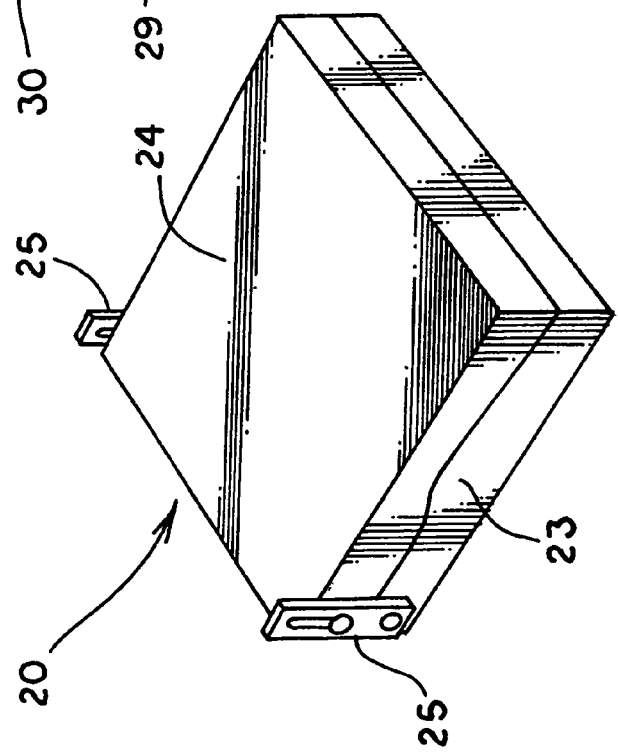
FIG. 5 is a somewhat schematic perspective view of the mold of FIG. 1 being shown in a closed condition after the step in the manufacturing process shown in FIG. 4.

After the liquid foam material 35 has been placed in mold cavities 26 and 27, at least partially on top of inserts 33 and 34 as shown in FIG. 4, mold 20 may be closed as shown in FIG. 5 and the foam material is allowed to cure.

Such brings fabric 32 in contact with the foam material 35 or, as previously described, the fabric 32 could be manually placed on top of the foam material 35. Dependent on the precise foam material selected, the curing process can be accelerated by heating mold 20. During the curing process, as the liquid foam 35 expands and ultimately solidifies, it penetrates or otherwise impregnates the porous inserts 33 and 34. The once pliant inserts 33 and 34 therefore become more rigid to provide a firm, yet still remain a somewhat flexible, material. It has been found that inserts which are stiffer and/or denser than other inserts prior to molding, will provide stiffer inserts after molding. Thus, if a very stiff insert is desired, one would select a fabric that is more dense, such as felt, for the insert material. Moreover, if a very dense material is selected for inserts 33 and 34, the foam material 35 may not impregnate the inserts all the way through, which could be desirable for certain applications.

Figure 6:
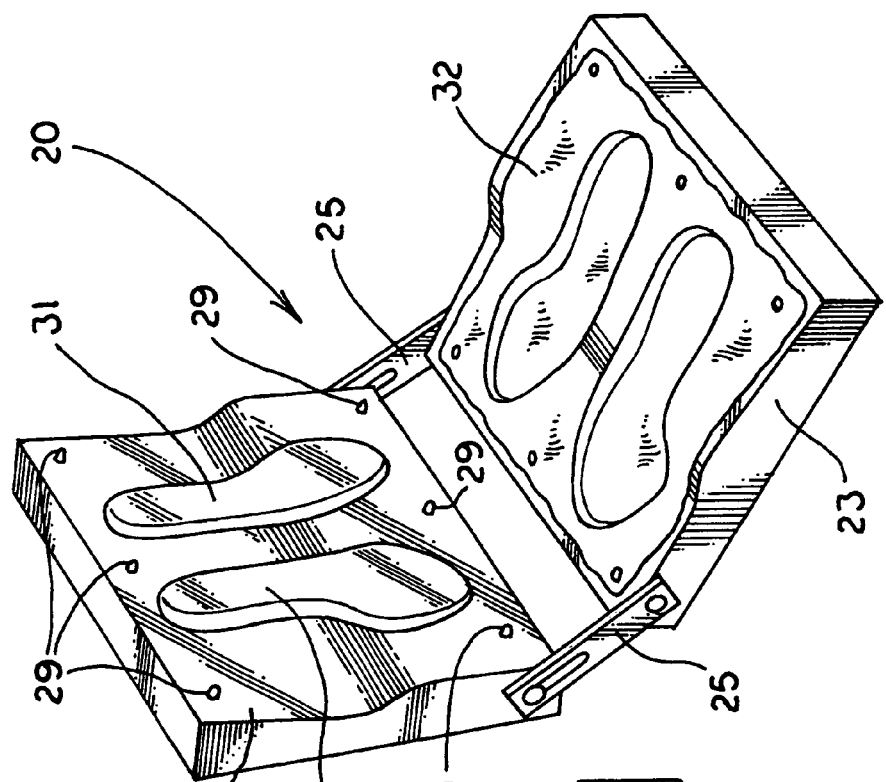
FIG. 6 is a somewhat schematic perspective view of the mold of FIG. 1 shown as being opened after the insoles have been cured.
Figure 7:
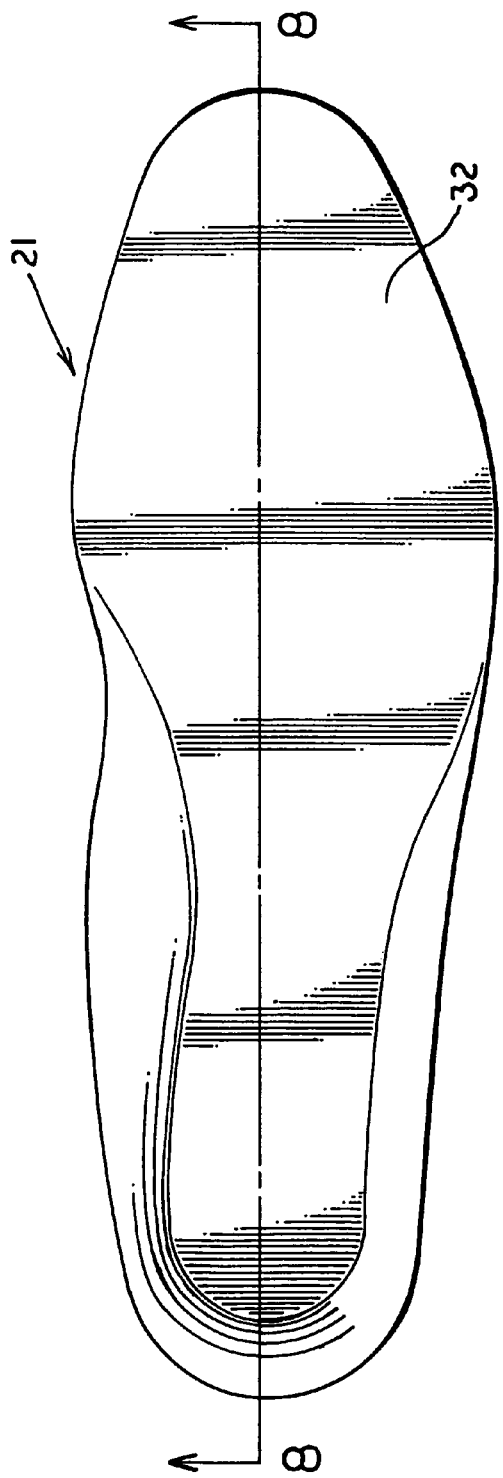
FIG. 7 is a bottom plan view of one of the insoles which was manufactured in accordance with the method shown in FIGS. 1-6.

After curing, mold 20 may be opened, as shown in FIG. 6, thereby exposing the finished product, that is, insoles 21 and 22, which are being carried by film 32. The film 32 may now be trimmed around the periphery of insoles 21 and 22 to form the final products as shown in FIGS. 7 and 9.

Figure 8:
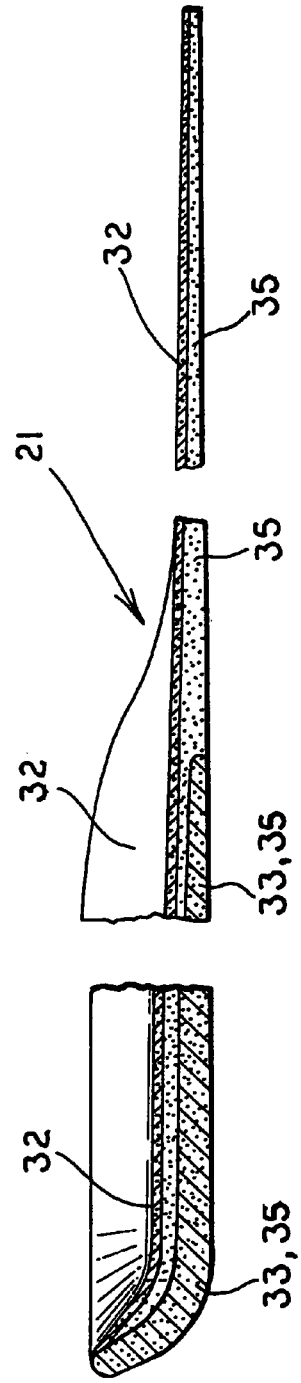
FIG. 8 is an enlarged, fragmentary sectional view taken substantially along line 8-8 of FIG. 7.

As best seen in FIG. 8, insole 21, which was produced with the thinner insert 33, is formed with a toe portion entirely made of the cured foam 35. The upper part of the heel of the insole 21 is likewise made of the foam 35, but the lower portion of the heel is more rigid as the foam 35 has impregnated the porous insert 33. The result for insole 22 is the same except, as shown in FIG. 10, the heel portion is formed entirely of the foam-impregnated insert 34 because insert 34 was thicker than insert 33, and because it was thicker than the depth of the mold cavity 27. As a result, at the heel area, insole 22 is stiffer than insole 21.

In view of the foregoing, it should be appreciated that by selecting the density and thickness of the insert, and by shaping the insert as desired, a foam product with localized rigidity at a desired position and of a desired amount can be readily produced. As a result, the objects of the invention are accomplished, thereby substantially improving the art.

What is claimed is:

1. A method of making a product having a length in a mold having a cavity with a peripheral configuration comprising the steps of placing a porous material onto a portion of the peripheral configuration of the cavity, inserting a foamable material in the mold, and allowing the foamable material to cure while at the same time completely impregnating the porous material so as to render the porous material more rigid and to become integral with the foamable material while maintaining a cushioned product, wherein the foamable material is coextensive with and extends in length beyond the porous material.

2. A method according to claim 1 wherein the porous material is thicker than the depth of the cavity.

3. A method according to claim 1 wherein the porous material is thinner than the depth of the cavity resulting in a product having a foam portion.

4. A method of making a product having a length in a mold which includes first and second mold sections comprising the steps of attaching a fabric to the first mold section, placing a porous material onto the second mold section, inserting a foamable material into the second mold section, and allowing the foamable material to cure while at the same time impregnating the porous material so as to render the porous material more rigid than the cured foamable material while maintaining a cushioned product wherein the foamable material is coextensive with and extends in length beyond the porous material.

5. A method according to claim 4 further comprising the step of closing the first mold section on the second mold section prior to allowing the foamable material to cure.

6. A method according to claim 5 wherein the step of allowing the foamable material to cure attaches the fabric to the foamable material.

7. A method of making a product having a length in a mold having a cavity in the shape of the product comprising the steps of placing a porous material only on a portion of the cavity; inserting a foamable material in the cavity; allowing the foamable material to cure to form the entire shape of the product while at the same time impregnating the porous material so as to render the porous material more rigid and positioned only in the portion of the length of the product, whereby the area of the product having only the foamable material is coextensive with and extends in length beyond the porous material while maintaining full flexibility while the portion of the product having the porous material is less flexible.

8. A method of making a product having a length in a mold including a mold section having at least one cavity comprising the steps of placing a porous material on the mold section, inserting a foamable material into the cavity, and allowing the foamable material to cure while at the same time completely impregnating the porous material so as to render the porous material more rigid and to become integral with the foamable material while maintaining a cushioned product wherein the foamable material is coextensive with and extends in length beyond the porous material.

9. A method of making a product having a length in a mold comprising the steps of placing a porous material into the mold so that it will be positioned on the outside of the product, inserting a foamable material in the mold, and allowing the foamable material to cure while at the same time impregnating the porous material so as to render the porous material more rigid and positioned on the outside of the product while maintaining a cushioned product wherein the foamable material is coextensive with and extends in length beyond the porous material.

* * * * *